(12) United States Patent
Määttä

(10) Patent No.: US 7,489,503 B2
(45) Date of Patent: Feb. 10, 2009

(54) FOLDABLE ELECTRONIC DEVICE

(75) Inventor: Esa Määttä, Farnborough (GB)

(73) Assignee: Nokia Corporation, Espoo (FI)

( * ) Notice: Subject to any disclaimer, the term of this patent is extended or adjusted under 35 U.S.C. 154(b) by 110 days.

(21) Appl. No.: 11/662,965

(22) PCT Filed: Sep. 21, 2004

(86) PCT No.: PCT/IB2004/003072

§ 371 (c)(1),
(2), (4) Date: Mar. 15, 2007

(87) PCT Pub. No.: WO2006/032938

PCT Pub. Date: Mar. 30, 2006

(65) Prior Publication Data

US 2008/0117572 A1    May 22, 2008

(51) Int. Cl.
*G06F 1/16*    (2006.01)
(52) U.S. Cl. .................. 361/683; 16/367; 345/168; 455/550.1
(58) Field of Classification Search .............. 16/50, 16/239, 367; 340/691.6; 345/156, 168; 455/550.1, 455/576.3; 206/320; 400/472; 361/679–687, 361/724–727
See application file for complete search history.

(56) References Cited

U.S. PATENT DOCUMENTS

| 6,341,061 | B1 | 1/2002 | Eisbach et al. | |
| 6,643,124 | B1 | 11/2003 | Wilk | |
| 7,299,523 | B2* | 11/2007 | Zou | 16/287 |
| 2002/0024499 | A1 | 2/2002 | Karidis et al. | |
| 2003/0006942 | A1 | 1/2003 | Searls et al. | |
| 2007/0227923 | A1* | 10/2007 | Kidakarn | 206/320 |
| 2008/0158795 | A1* | 7/2008 | Aoki et al. | 361/681 |

FOREIGN PATENT DOCUMENTS

KR    2003-12076    2/2003

* cited by examiner

*Primary Examiner*—Hung V Duong
(74) *Attorney, Agent, or Firm*—Alfred A. Fressola; Ware, Fressola, Van Der Sluys & Adolphson LLP

(57) ABSTRACT

The invention relates to a foldable electronic device comprising a casing (1) with a top cover (2) and a base cover (3), a display (5) and a keyboard (8) with a plurality of keycaps. To provide a foldable electronic device which is more comfortable to use and which does not require increased attentiveness and concentration when looking at the display, according to the present invention the display (5) comprises a first display portion (6) and a second display portion (7), the first display portion (6) being accommodatable within or adjacent to the top cover (2) and the second display portion (7) being accommodatable within or adjacent to the base cover (3) of the casing (1), wherein the first display portion (6) forms the upper part of the display (5) and the second display portion (7) forms the lower part of the display (5).

21 Claims, 3 Drawing Sheets

FOLDABLE ELECTRONIC DEVICE

CROSS REFERENCE TO RELATED APPLICATIONS

This application is the U.S. National Stage of International Application Number PCT/IB04/003072 filed on Sep. 21, 2004 which was published in English on Mar. 30, 2006 under International Publication Number WO 2006/032938.

TECHNICAL FIELD

The invention relates to a foldable electronic device comprising a casing with a top cover and a base cover being pivotably connected to each other by means of a hinge, such that the top cover can be pivoted relative to the base cover between an opened position and a closed position, a display which is visible in the opened position of the casing and which is hidden inside the casing in the closed position of the casing and a keyboard with a plurality of keycaps.

BACKGROUND OF THE INVENTION

Various electronic devices, especially hand-held computing devices, have become popular as portable computers, personal organizers and as wireless communication devices due to there small size and portability.

These devices typically comprise a two-part casing having a top cover and a base cover, wherein a display is fixedly accommodated within the top cover and wherein a keyboard with a plurality of keycaps is fixedly accommodated within the base cover. The top cover with the integrated display is pivotably connected to the base cover with the integrated keyboard via a hinge. The top cover can be pivoted relative to the base cover between an opened position and a closed position, wherein in the closed position the top cover and the base cover are stacked together. When pivoting the top cover relative to the base cover to an opened position, the display and the keyboard which are arranged at the inner side of the casing become visible and the electronic device becomes operateable. In the closed position of the casing both the display and the keyboard are surrounded by the casing so as to form a protecting jacket around the sensitive and damageable parts inside the casing, that is the keyboard and especially the display.

Since such electronic devices are often used as portable devices, the size, that is the length and the width, of the casing parts have to be reduced to a minimum. As a consequent, the display and the keyboard are small sized, too. Various devices are known from the state of the art which size and shape are such that they easily fit into pockets of clothing pieces, such as trouser pockets.

The problem of the known devices is that due to the relative small size of the display operation of the electronic device require increased attentiveness and concentration. Especially when browsing internet, writing documents, viewing photos or, in case of a navigation system, viewing road maps, the display of such electronic devices is inadequate in size.

SUMMARY OF THE INVENTION

It is an object of the invention to provide a foldable electronic device which is more comfortable to use and which does not require increased attentiveness and concentration when looking at the display.

According to one embodiment of the present invention a foldable electronic device as initially described is provided, wherein the display comprises a first display portion and a second display portion, the first display portion being accommodatable within or adjacent to the top cover of the casing and the second display portion being accommodatable within or adjacent to the base cover of the casing, and wherein the first display portion forms the upper part of the display and the second display portion forms the lower part of the display.

In other words, a two-part display is provided which folds open, when the casing of the electronic device is opened so as to form a large common display consisting of a first (upper) display portion and a second (lower) display portion. Such an enlarged display is very comfortable especially when browsing internet, writing a document or viewing road maps, photos etc.

Since according to the present invention one of the first and second display portions is being arranged in the area in which according to the state of the art typically the keyboard is being arranged, according to a further embodiment of the present invention the keyboard is connected to the base cover and/or to the second display portion, wherein the keyboard is preferably accommodateable within the base cover and/or the second display portion.

According to another embodiment of the present invention the connection between the keyboard and the base cover and/or the second display portion is a slideable connection, wherein the keyboard is arranged slideably relative to the base cover and/or the second display portion between a closed position and an opened position.

According to yet another embodiment of the present invention the keyboard is an out pullable keyboard, wherein in the closed position the keyboard is at least partly surrounded by the base cover and/or the second display portion. Preferably, in the closed position of the keyboard the plurality of keycaps is at least partly covered by the base cover and/or the second display portion. When the keyboard is pulled out it can be used for typing, and when the keyboard is in its closed position the keyboard and/or the plurality of keycaps is protected at least partly inside the casing of the electronic device.

According to a further embodiment of the present invention the connection between the keyboard and the base cover and/or the second display portion is a pivotable connection, wherein the keyboard is arranged pivotably relative to the base cover and/or the second display portion between an upper position and a lower position. Preferably, the keyboard is both slideable and pivotable, such that for example when pulling out the keyboard the keyboard slides out parallel to the base cover and/or the second display portion to the opened position and than the keyboard can be pivoted to a lower position which allows ergonomical positioning of the keyboard.

According to yet another embodiment of the present invention the first and second display portions are connected to each other via a hinge, wherein the first display portion is further connected hingedly to the top cover and wherein the second display portion is further connected hingedly to the base cover, wherein in the opened position of the casing the first and second display portions are at least partly folded out of the respective cover and wherein in the closed position of the casing the first and the second display portions are accommodated within and/or adjacent to the respective cover.

Alternatively, the first and second display portions, instead of being connected hingedly to each other and to the respective covers, are fixedly mounted to the respective cover, wherein in the opened position and in the closed position of the casing the first and second display portions are accommodated within and/or adjacent to the respective cover. This allows to fold out the first and second display portions in such a way that both display portions can be arranged in one common plain so as to form a flat common display.

According to yet another embodiment of the present invention the top cover and the base cover each have a length and a width, wherein the first display portion and/or the second display portion extend essentially over the whole length and/or the whole width of the respective cover.

According to a further embodiment of the present invention the first and second display portions have the same size. It's understood that instead of having the same size in some cases the display portions can have different sizes.

According to another embodiment of the present invention each of the first and second display portions are also operatable as separate displays. In other words, it is possible to use the first display portion as a first display, for example as a display for showing photos, road maps or other graphical information, and to use the second display portion as a second display, for example for showing text information.

According to yet another embodiment of the present invention the electronic device is a mobile device, especially a hand-held device.

BRIEF DESCRIPTION OF THE DRAWINGS

The features of the present invention presented above as well as other features will now be described in greater detail with reference to the attached drawings, wherein.

DETAILED DESCRIPTION OF THE DRAWINGS

In FIGS. 1 to 4 a foldable electronic device according to the present invention is shown during a typical opening action.

The shown foldable electronic device comprises a casing 1, wherein the casing 1 is divided into a top cover 2 and a base cover 3 being pivotably connected to each other by means of a hinge 4. This allows the top cover 2 to be pivoted relative to the base cover 3 between a closed position and an opened position.

Figure 1:
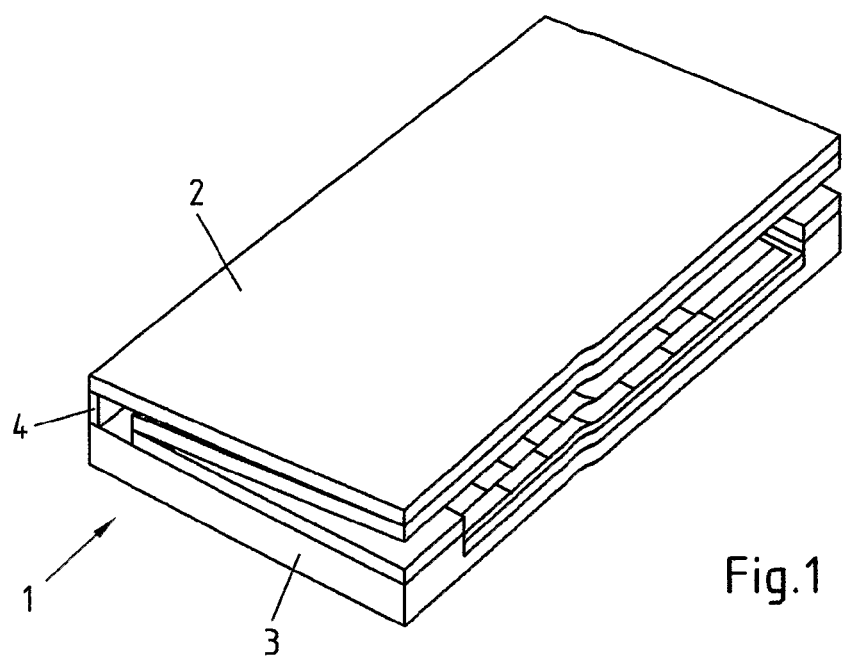
FIG. 1 illustrates in a schematic perspective view a foldable electronic device according to the present invention in a nearly closed position.

FIG. 1 illustrates the first step of the opening action, wherein the casing 1 is in a nearly closed position.

Figure 2:
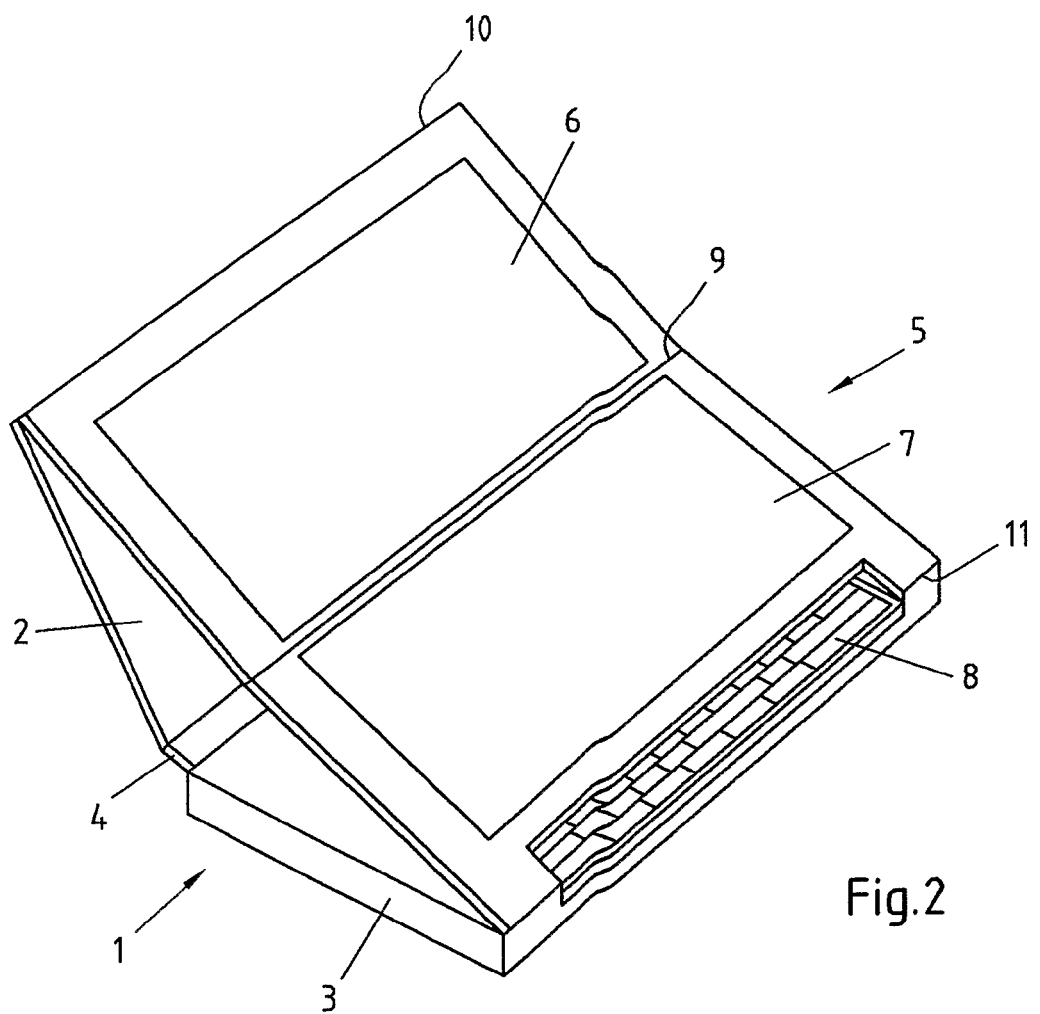
FIG. 2 illustrates in a schematic perspective view the electronic device from FIG. 1 in an opened position with the keyboard being inside the casing.

FIG. 2 illustrates the second step of the opening action of the casing 1. In FIG. 2 the top cover 2 and the base cover 3 of the casing 1 are spread open to a maximum, thereby folding out a two-part display 5 comprising a first display portion 6 and a second display portion 7.

Comparing FIGS. 1 and 2 it can be seen that the display 5 is hidden inside the casing 1 in the closed position and is visible in the opened position. In the present embodiment in the closed position the first display portion 6 is accommodated adjacent to the top cover 2 and the second display portion 7 is accommodated within the base cover 3.

According to the embodiment shown in FIGS. 1 to 4 the first and second display portions 6, 7 are connected to each other via a hinge 9. The first display portion 6 is further connected to the top cover 2 via a further hinge 10 and the second display portion 7 is further connected to the base cover 3 via a further hinge 11. This allows to fold the first and second display portions 6, 7 out of the respective cover 2, 3 and, in the closed position, to accommodate the first display portion 6 adjacent to the top cover 2 and the second display portion 7 within the base cover 3.

Figure 3:
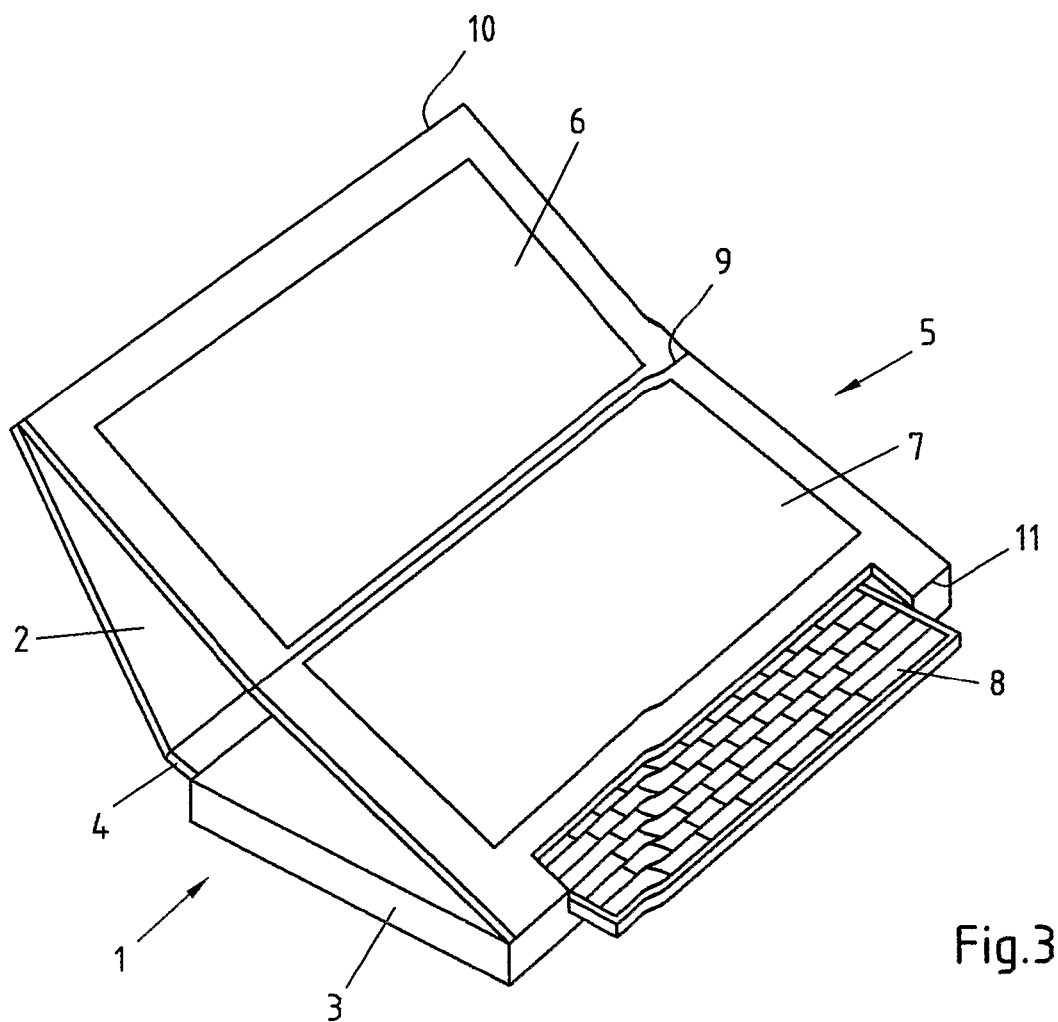
FIG. 3 illustrates in a schematic perspective view the electronic device from FIG. 1 in the opened position with the keyboard being pulled out of the casing.

FIG. 3 illustrates the third step of the opening action. Comparing FIGS. 2 and 3 it can be seen that a keyboard 8 is arranged slideably relative to the base cover 3 between a closed position (FIG. 2) and an opened position (FIG. 3). As shown in FIG. 3, in the closed position the keyboard 8 is partly surrounded by the base cover 3 and the second display portion 7. As shown in FIG. 3, when pulled out the keyboard 8 and the keycaps are all visible.

Figure 4:
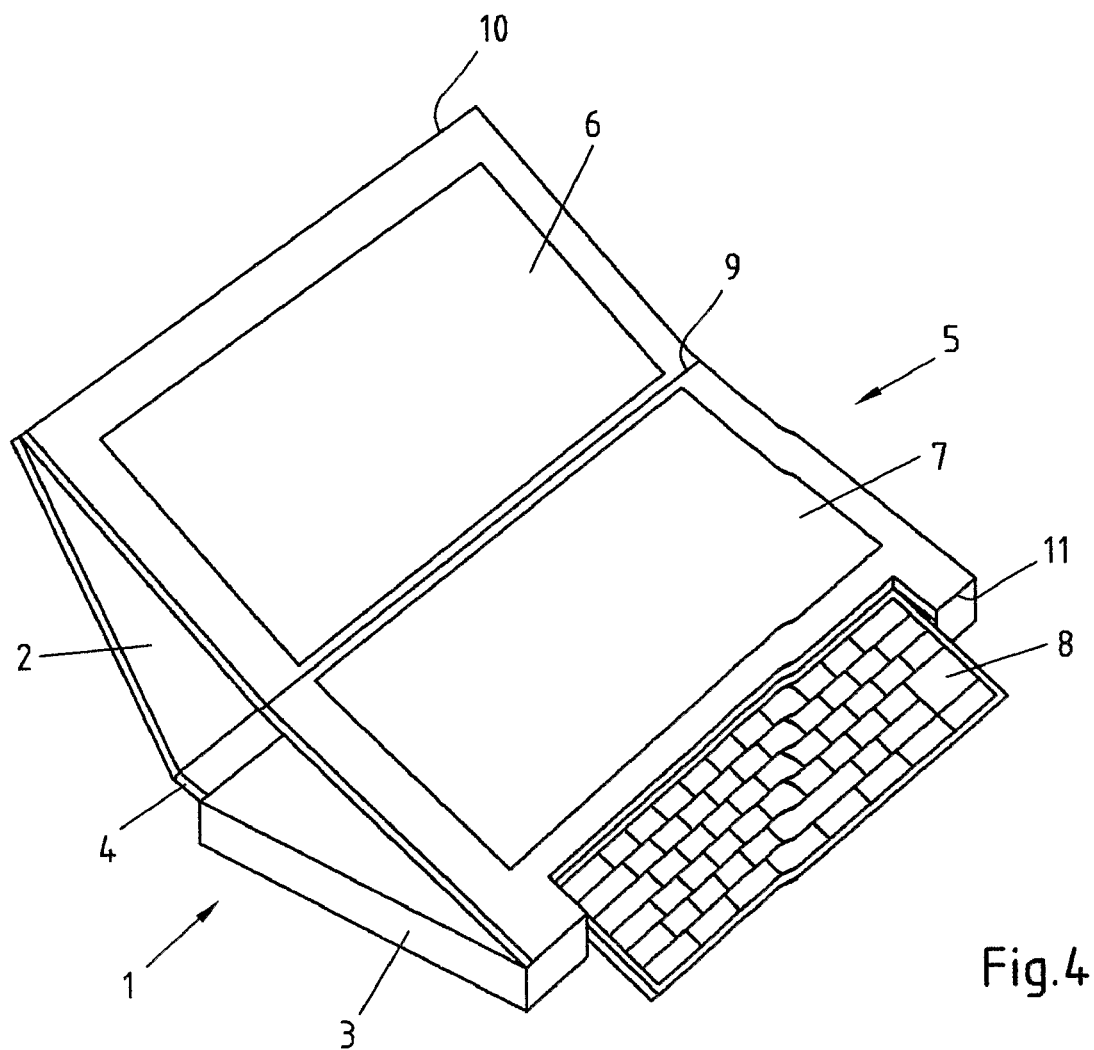
FIG. 4 illustrates in a schematic perspective view the electronic device from FIG. 1 in the opened position with the keyboard being pulled out and being pivoted to a lower position.

FIG. 4 illustrates the fourth step of the opening action. Comparing now FIGS. 3 and 4 it can be seen that the keyboard 8 is not only arranged slideably but also pivotably relative to the base cover 3 and second display portion 7 from an upper position to a lower position so as to form an ergonomical position for typing on the keyboard 8.

Referring to FIGS. 2 to 4, the top cover 2 and the base cover 3 have a certain length and width, wherein the first display portion 6 and the second display portion 7 extend essentially over the whole length and the whole width of the respective cover 2, 3. Further, it can be seen that the first and second display portions 6, 7 have essentially the same size.

The foldable electronic device shown in FIGS. 1 to 4 is relative small-sized and therefore easily fits into pockets of clothing pieces such as trouser pockets. Nevertheless, in the opened position of the casing 1 the common display 5 is large enough for comfortably browsing internet, writing documents etc.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A foldable electronic device comprising
 a casing with a top cover and a base cover being pivotably connected to each other by means of a hinge, such that the top cover can be pivoted relative to the base cover between an opened position and a closed position,
 a display which is visible in the opened position of the casing and which is hidden inside the casing in the closed position of the casing, and the display having a first display portion and a second display portion, the first display portion being accommodatable within or adjacent to the top cover of the casing and the second display portion being accommodatable within or adjacent to the base cover of the casing, wherein the first display portion forms the upper part of the display and the second display portion forms the lower part of the display, a keyboard with a plurality of keycaps, wherein the keyboard is connected to the base cover and/or to the second display portion, and wherein the keyboard is both slideable and pivotable relative to the base cover and/or the second display portion between a closed position and an opened position, wherein in the closed position the keyboard is at least partly surrounded by the base cover and/or the second display portion.

2. The electronic device according to claim 1, wherein the keyboard is accommodatable within the base cover and/or the second display portion.

3. The electronic device according to claim 1, wherein in the closed position of the keyboard the plurality of keycaps is at least partly covered by the base cover and/or the second display portion.

4. The electronic device according to claim 1, wherein the keyboard is arranged pivotably relative to the base cover and/or the second display portion between an upper position and a lower position.

5. The electronic device according to claim 1, wherein the first and second display portions are connected to each other via a hinge, wherein the first display portion is further connected hingedly to the top cover, wherein the second display portion is further connected hingedly to the base cover, wherein in the opened position of the casing the first and second display portions are at least partly folded out of the respective cover and wherein in the closed position of the casing the first and second display portions are accommodated within or adjacent to the respective cover.

6. The electronic device according to claim 1, wherein the first and second display portions are fixedly mounted to the respective cover, wherein in the opened position of the casing and in the closed position of the casing the first and second display portions are accommodated within the respective cover.

7. The electronic device according to claim 1, wherein the top cover and the base cover each have a length and a width, wherein the first display portion and/or the second display portion extend essentially over the whole length and/or whole width of the respective cover.

8. The electronic device according to claim 1, wherein the first and second display portions have the same size.

9. The electronic device according to claim 1, wherein each of the first and second display portions are also operatable as separate displays.

10. A mobile device comprising the electronic device according to claim 1.

11. A foldable electronic device comprising
a casing with a top cover and a base cover being pivotably connected to each other by means of a hinge, such that the top cover can be pivoted relative to the base cover between an opened position and a closed position, a display which is visible in the opened position of the casing and which is hidden inside the casing in the closed position of the casing the display having—a first display portion and a second display portion, the first display portion being accommodatable within or adjacent to the top cover of the casing and the second display portion being accommodatable within or adjacent to the base cover of the casing, wherein the first display portion forms the upper part of the display and the second display portion forms the lower part of the display, a keyboard with a plurality of keycaps, and wherein the first and second display portions are connected to each other via a hinge, wherein the first display portion is further connected hingedly to the top cover, wherein the second display portion is further connected hingedly to the base cover, wherein in the opened position of the casing the first and second display portions are at least partly folded out of the respective cover and wherein in the closed position of the casing the first and second display portions are accommodated within or adjacent to the respective cover.

12. The electronic device according to claim 11, wherein the keyboard is connected to the base cover and/or to the second display portion.

13. The electronic device according to claim 11, wherein the keyboard is accommodatable within the base cover and/or the second display portion.

14. The electronic device according to claim 12, wherein the keyboard is arranged slideably relative to the base cover and/or the second display portion between a closed position and an opened position.

15. The electronic device according to claim 11, wherein the keyboard is an out pullable keyboard, wherein in the closed position the keyboard is at least partly surrounded by the base cover and/or the second display portion.

16. The electronic device according to claim 15, wherein in the closed position of the keyboard the plurality of keycaps is at least partly covered by the base cover and/or the second display portion.

17. The electronic device according to claim 11, wherein the connection is a pivotable connection, wherein the keyboard is arranged pivotably relative to the base cover and/or the second display portion between an upper position and a lower position.

18. The electronic device according to claim 11, wherein the top cover and the base cover each have a length and a width, wherein the first display portion and/or the second display portion extend essentially over the whole length and/or whole width of the respective cover.

19. The electronic device according to claim 11, wherein the first and second display portions have the same size.

20. The electronic device according to claim 11, wherein each of the first and second display portions are also operatable as separate displays.

21. A mobile device comprising the electronic device according to claim 11.

* * * * *

UNITED STATES PATENT AND TRADEMARK OFFICE
CERTIFICATE OF CORRECTION

PATENT NO.       : 7,489,503 B2
APPLICATION NO.  : 11/662965
DATED            : February 10, 2009
INVENTOR(S)      : Maatta Page 1 of 1

It is certified that error appears in the above-identified patent and that said Letters Patent is hereby corrected as shown below:

At column 6, lines 42 and 43, claim 17, lines 1 and 2, please delete the phrase "wherein the connection is a pivotable connection".

Signed and Sealed this

Twelfth Day of May, 2009

JOHN DOLL
*Acting Director of the United States Patent and Trademark Office*